Apr. 10, 1923.
H. F. MARANVILLE
1,451,169
APPARATUS FOR THE PREPARATION OF TIRE BEADS
Filed July 22, 1919 5 sheets-sheet 4
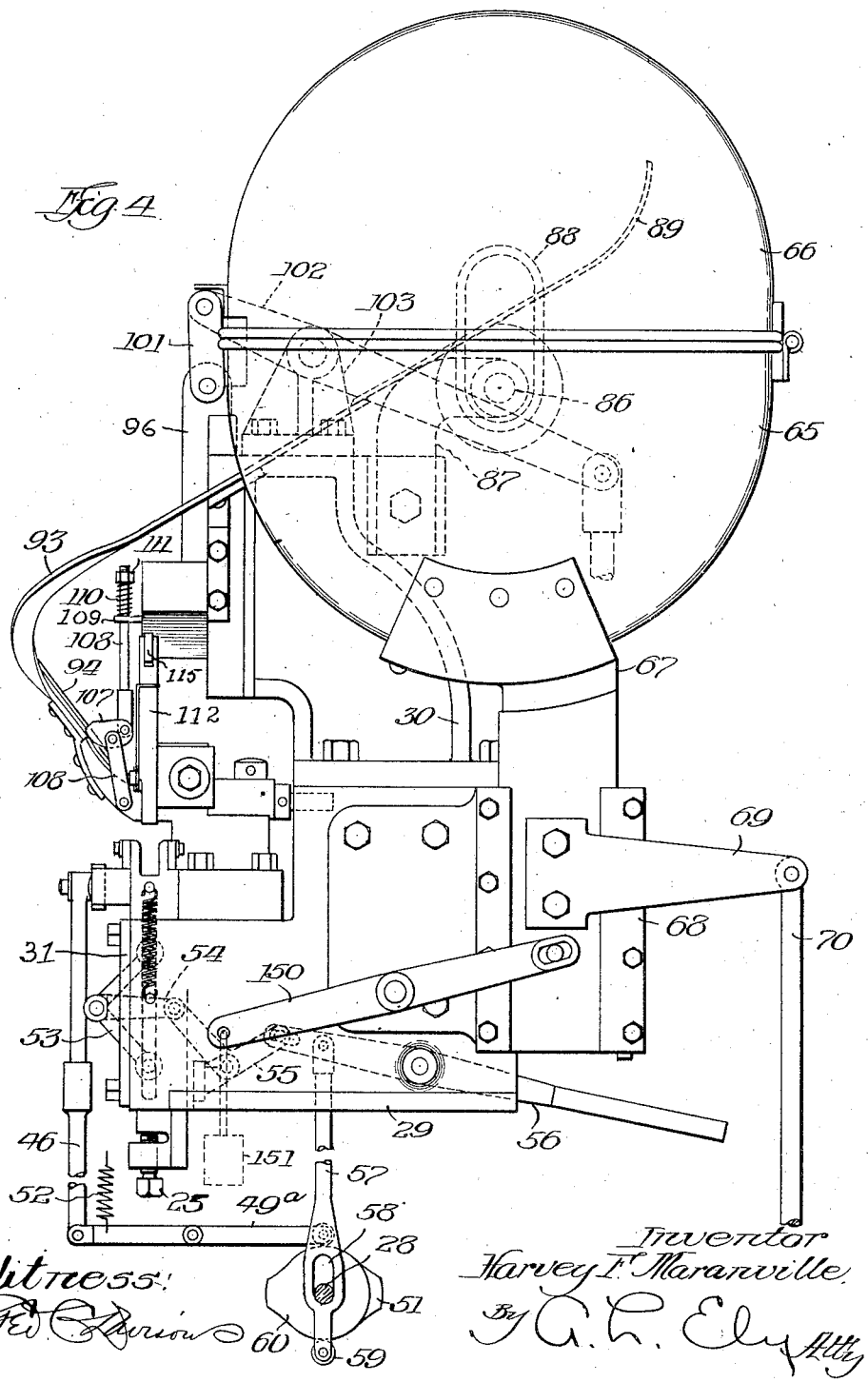

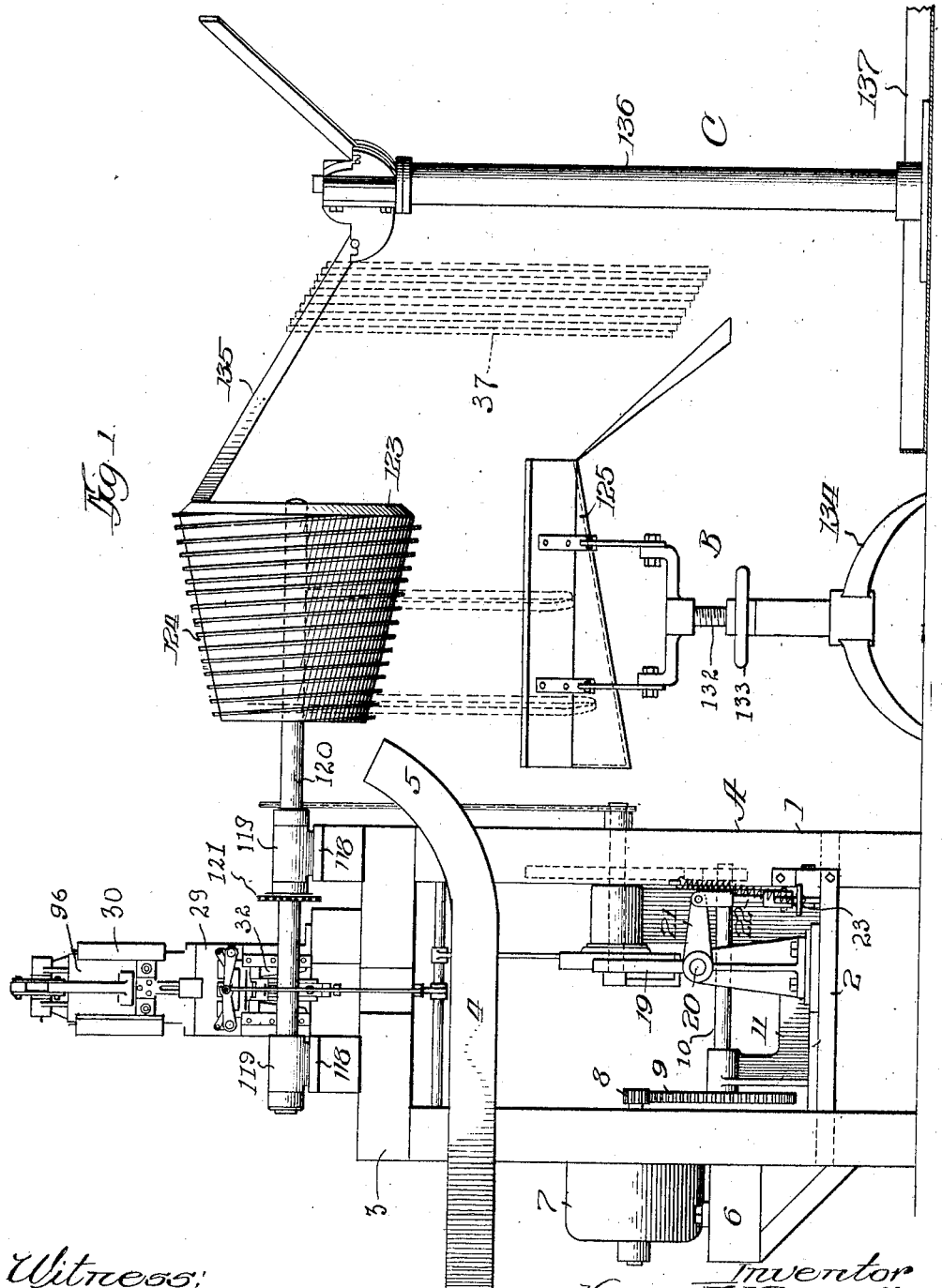

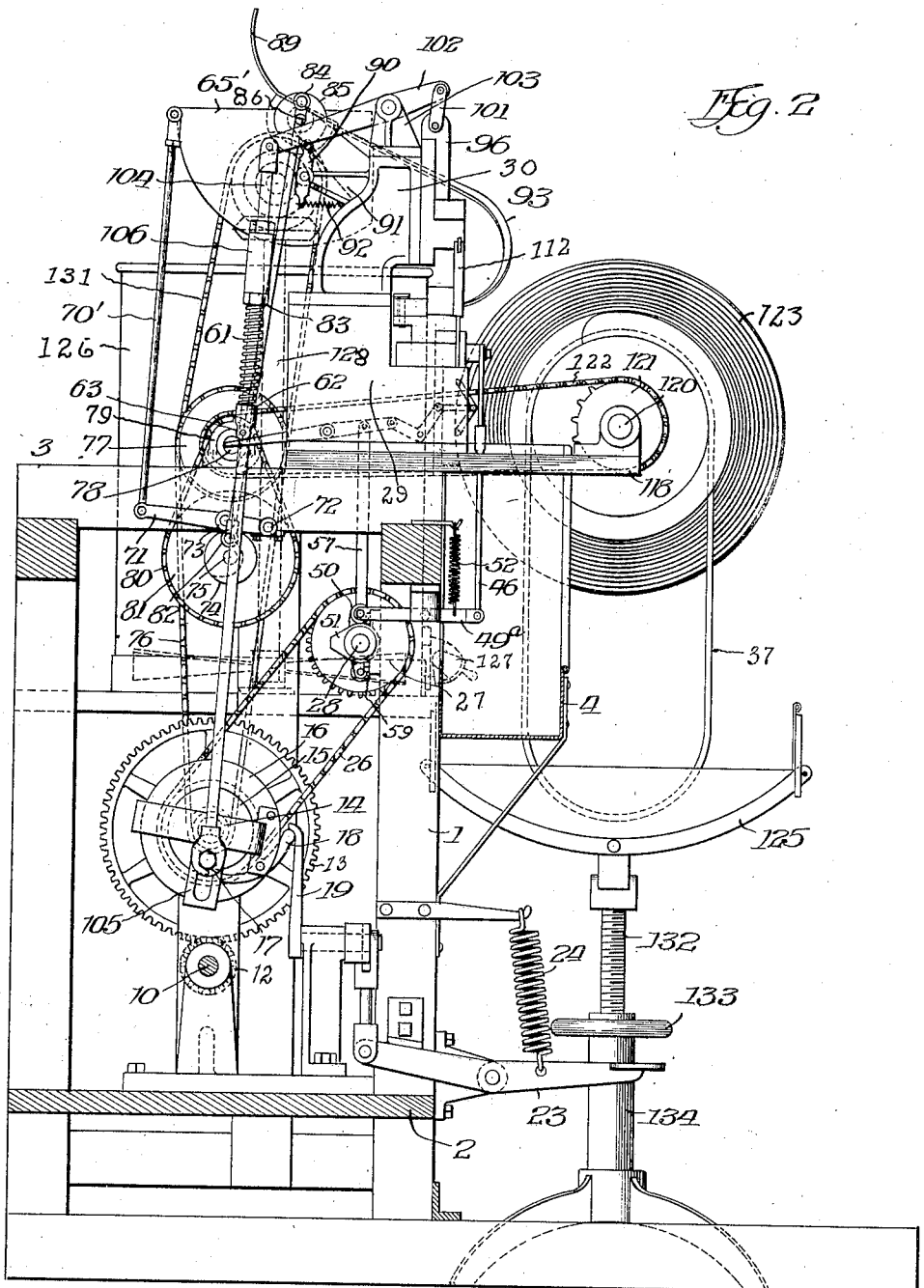

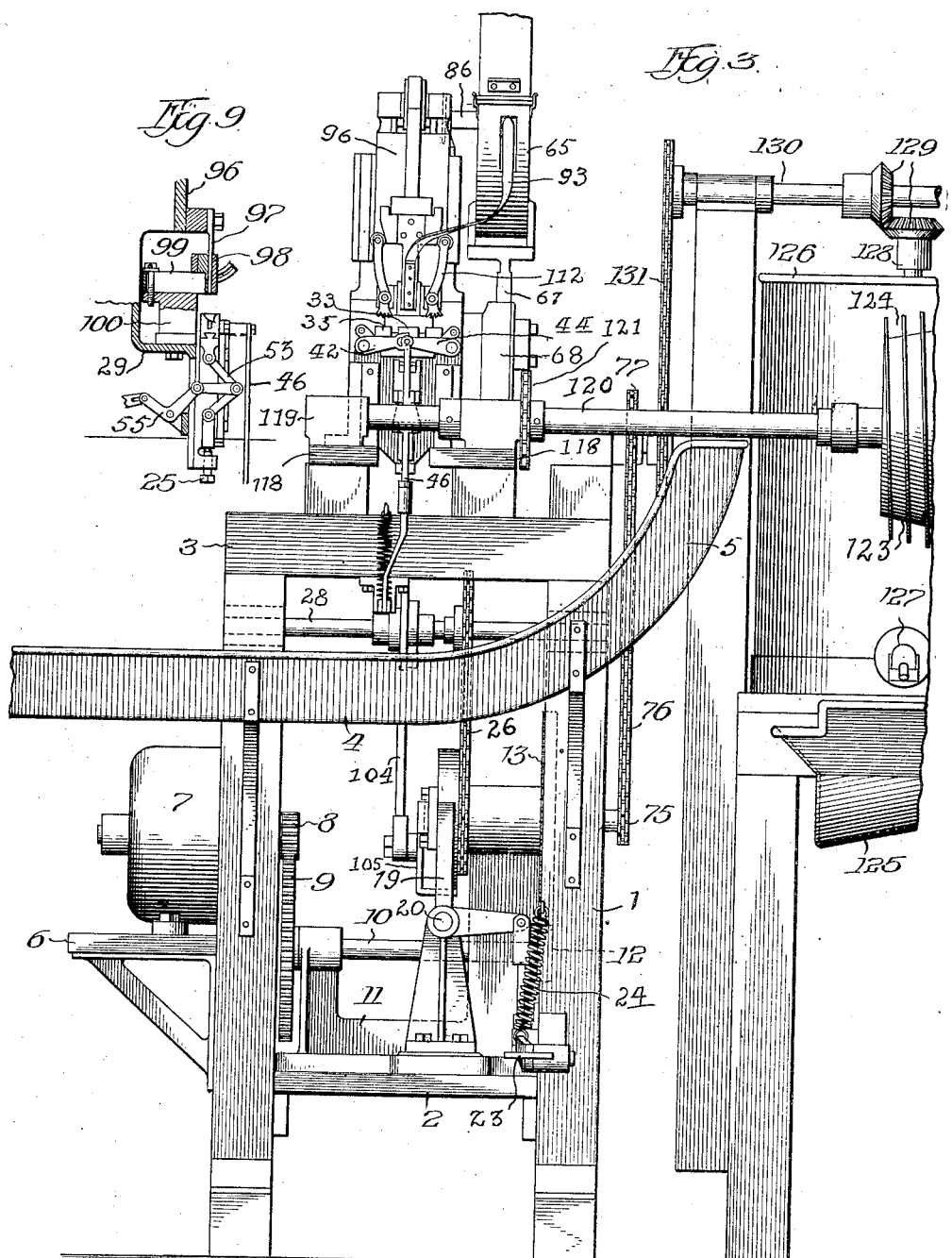

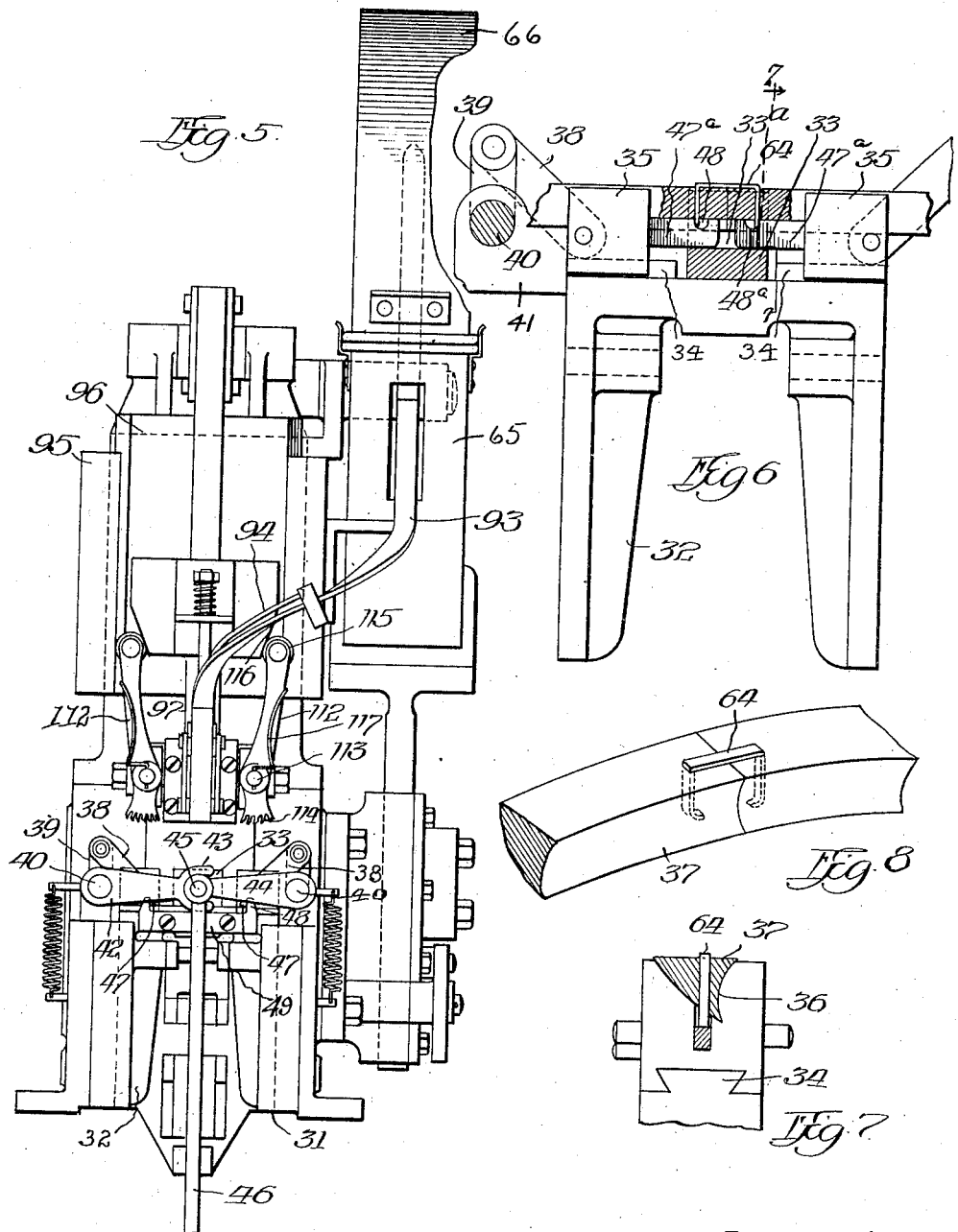

Patented Apr. 10, 1923.

1,451,169

UNITED STATES PATENT OFFICE.

HARVEY F. MARANVILLE, OF AKRON, OHIO, ASSIGNOR TO THE FIRESTONE TIRE AND RUBBER COMPANY, OF AKRON, OHIO, A CORPORATION OF OHIO.

APPARATUS FOR THE PREPARATION OF TIRE BEADS.

Application filed July 22, 1919. Serial No. 312,474.

*To all whom it may concern:*

Be it known that I, HARVEY F. MARANVILLE, a citizen of the United States, residing at Akron, in the county of Summit, State of Ohio, have invented certain new and useful Improvements in Apparatus for the Preparation of Tire Beads, of which the following is a specification.

This invention relates to the preparation of tire beads, and its prime object is to provide for uniting the ends of bead strips to form bead rings and then for coating the rings so formed with rubber cement, the operations being successive and carried out in a unitary apparatus.

It has formerly been the practice to unite the two ends of a bead strip in a variety of ways, but all of the methods have been more or less unsatisfactory and I have devised a new form of connection for the ends of the beads as described in my prior Patent No. 1,329,463, granted February 3, 1920. The object of my present invention is to construct a machine for the purpose of quickly and efficiently uniting the bead ends by inserting a staple across the joint in the bead, in combination with an effective coating machine for applying the coat of cement which is given to the bead prior to its incorporation in the tire.

The application of the rubber cement to the circular bead has been a messy and wasteful operation as it has been the practice to take a handful of beads, immerse them in a pan of cement and then hang them on hooks or racks for draining and drying. As a result, the sticky, stringy cement coats the operator and covers the floor and walls of the bead room. This has been a most disagreeable and wasteful feature of the manufacture of beads and it is one of the objects of this invention to combine the bead end uniting and the coating in a single unitary apparatus, so that the work can be done mechanically. Although the coating machine is shown here, it is not my intention to claim it per se in this application as this, together with the drying apparatus, forms the subject of a copending application, Serial No. 335,513, filed November 3, 1919.

The machine for stapling the beads forms the subject matter of a divisional application, Serial No. 389,974, filed June 18, 1920.

These and other objects will be apparent as the description proceeds, and from an inspection of the drawings accompanying this application. It will be understood that the form of machine shown in the drawings is illustrative of the invention merely and the invention is not limited to the precise details but may be varied within the skill of a mechanic without sacrificing any of the benefits of the invention.

Fig. 1 is a front elevation of the stapling machine, the bead dipping tank and one of the drying racks.

Fig. 2 is a side elevation of the machine.

Fig. 3 is a front elevation of the stapling machine.

Fig. 4 is an enlarged elevation of the upper part of the stapling machine looking from the opposite side of Fig. 2.

Fig. 5 is an enlarged front view of the machine.

Fig. 6 is a detailed view of the bead carrier.

Fig. 7 is a section of the line 7—7 of Fig. 6.

Fig. 8 is a detail of the stapled bead.

Fig. 9 is a detailed sectional view through the hammer and bead carriers.

The apparatus as shown in Fig. 1 comprises a stapling machine unit, a coating or dipping apparatus, and a drying rack. The stapling machine is shown at A, the coating or dipping apparatus at B and the drying rack at C.

The stapling machine comprises a framework 1 which supports a platform 2 and a table 3. To the front of the framework is attached a trough or rack 4 in which are laid the semi-cured beads cut to the proper length, the forward end of the trough being bent or curved upwardly as at 5.

At one side of the machine is carried a platform 6 on which is supported the motor 7 for driving the machine by means of a pinion 8 in mesh with a main driving gear 9. The last mentioned gear is secured to a shaft 10, rotatably mounted in a bracket 11, carried on the platform 2. On the opposite end, the shaft 10 carries a pinion 12 in mesh with a gear 13 on the driving shaft 14. On the opposite end of the shaft 14 is secured a disk 15, which constitutes one unit of a single revolution clutch, the other portion being the surrounding annulus 16. The part 15 is provided with a notch 17, and the part 16 with a pawl 18 which are designed to lock the clutch for driving action. A lever 19 which is secured to a rock shaft 20 extends in the path of the pawl and serves to disconnect the two parts. The rock shaft 20 carries an arm 21 connected by a link 22 to a foot treadle 23 by which the clutch is operated. A spring 24 normally holds the lever 19 in position to disengage the clutch. From the portion 16 of the clutch is driven a sprocket chain 26 which passes around a sprocket 27 on a shaft 28 which extends across the machine and may be termed the main cam shaft.

On the table 3 is carried the stapling machine head which comprises a base portion 29 and an overhanging head 30. The face of the base portion of the stapling machine is provided with a vertical guideway 31 in which is arranged for reciprocation the bead carrier 32, a set screw 25 being provided to limit the downward movement of the carrier, which carrier is shown detached in Fig. 6. In the center of the upper surface of the carrier is arranged the stationary anvil 33, the upper surface of which is arranged with a groove, or recess, to receive the ends of the bead in the position shown in Fig. 7. Below the recess and opening therefrom is arranged a slot or groove 33$^a$, the purpose of which will presently appear.

At the sides of the anvil are arranged dove tailed ribs or guides 34, on which are mounted for longitudinal reciprocation a pair of saddles 35, the upper surfaces of which are formed with grooves 36 to receive the bead 37 (Fig. 7).

To each of the saddles 35 is pivoted a link 38, which is pivoted to an arm 39 secured to a rocking shaft 40. From the vertical movable bead carrier 32 are extended at both sides lugs or ears 41 which form bearings for the rocking shaft.

To the front end of one of the shafts 40 is secured a lever 42, the free end of which is formed with a forked end 43, the other shaft carrying a lever 44, the end of which is jointed, by a pin 45 with a vertical rod 46. The forked end of the lever 42 passes over the pin in order that the two arms may be rocked in unison. On each reciprocating saddle is carried a pin 47 which is arranged to engage with a stop 48 projecting from a plate 49 secured to the front of the bead carrier.

It will be understood that the bead length is taken from the trough or rack 4 and bent around to form a circle, the ends being abutted and placed on the anvil 33. The bead carrier is then raised to bring the bead in position to be stapled and at the same time the saddles 35 are moved inwardly slightly on the guideway 34, due to the fact that the pin 45 is stationary and the upward movement of the carrier is translated into an inward movement of the saddles as will be readily understood, which inward movement serves to push the ends of the bead together.

When the staple has been driven into the bead, it is necessary to clinch the ends. It is impractical to rely upon the anvil to turn the ends of the staple as the staples are quite heavy and the soft character of the bead will prevent such action being performed satisfactorily. In order to accomplish the action, there is provided in the machine a pair of hammers or slides which receive the ends of the staple and are driven inwardly to clinch the points. These hammers take the form of tongues 47$^a$ extended from the saddles and arranged to reciprocate in the groove 33 and in the anvil. The forward end of each tongue or slide 47$^a$ is formed with a semi-circular recess 48 or 48$^a$ which, when the carrier is raised is located under the point where the staple pierces the bead. To drive the hammers inwardly to clinch the points of the staple, the rod 46 is given an upward thrust by means of a rocking lever 49$^a$ pivoted to the frame of the machine and carrying a roller 50 which runs on a cam 51 located on the cam shaft 28. A spring 52 serves to hold the roller on the cam. The cam is so timed that the slides will move inwardly at the termination of each driving stroke of the main staple driving hammer, thereby positively clinching or turning over the point of the staple.

To move the bead carrier upwardly there is arranged between the bed of the machine 29 and the bead carrier 32, a toggle 53, the knee of which is connected to a link 54 pivoted to a bell crank 55 which is in turn connected to a rocking lever 56 pivoted on the bed of the machine. Pivoted to the rocking lever 56 is a link 57, the lower end of which is slotted as at 58 to pass over the shaft 28 and carries a roller 59 which contacts a cam 60 in the shaft. The lever 56 is extended rearwardly and is pressed downwardly to hold the roller 59 in contact with its cam by any suitable spring means; in the particular form shown, a coil spring 61 surrounding a convenient portion of the machine and bearing on its lower end on a collar 62, having rollers 63 resting on the upper side of the forked lever 56.

The machine shown here is intended to handle staples which are in loose or individual form, but the broad invention is not limited to the use of this type of staple, as it covers the use of staples or similar articles in any form.

The staples, one of which is shown and designated by the numeral 64, are stored in a movable bin or hopper 65, provided with a swinging cover 66. The bin is secured to a slide 67 mounted to reciprocate in a guideway 68 on the rear of the machine head.

To the slide is secured an arm 69 which is pivoted to a vertical rod 70, the lower end of which is connected to a lever 71. At the opposite end, the lever 71 is pivoted to the frame of the machine at 72, and at a midway point it carries a roller 73 resting on a cam 74 secured to a horizontal shaft 75. The slide has pivotally connected to it a lever 150 on which is swung a counterweight 151 to balance the weight of the bin. The shaft 75 is constantly driven from a pinion mounted on the continuously driven shaft 14 by a sprocket chain 76 which also passes over a sprocket 77 on a jack shaft 78. On the shaft 78 is a small sprocket pinion 79 over which passes a chain 80 to a sprocket 81 on the shaft 75.

To the shaft 75 is also secured a crank pin 82 to which is pivoted a link 83 connected to a crank pin 84, on a disk 85 secured to a shaft 86, which is rotatably mounted in brackets 87 on the head of the machine. The shaft 86 passes through a slot 88 in the bin. Midway of the shaft within the bin is carried a picker arm 89 which is formed of a flat strip of metal, preferably curved upward at its end and pointed. To the head of the machine, near the upper end of the link 83, is arranged a dog 90, pivotally mounted on a bracket 91 and held by a spring 92. The function of this dog is to prevent the rod 83 from passing a dead center so that the rotary motion of the crank 82 is changed to a vibratory motion of the picker. The cam 74 and the crank pin 82 are so located with reference to each other that as the staple picker moves downwardly, the bin will also be lowered, so that the end of the picker arm will pass over the staples in the bottom of the bin. As the picker arm moves upwardly, the bin also moves upwardly and the picker arm will pass through the mass of loose staples, and will pick up such staples as come within its path, and are turned with the points downward. The movement of the bin and the passage of the arm through the mass of staples stirs them up constantly and a supply is being picked up at all times sufficient to feed the machine.

As a modification of the vertically movable bin for the staples there may be substituted a pivoted bin 65' to the rear end of which is attached a link 70' operated from the lever 71. In this case the bin, instead of moving vertically, rocks about its pivot, located at any suitable point in the head of the machine. This construction is shown in Fig. 2.

When the end of the picker arm is moved upwardly to the limit of its movement, the arm is tilted downwardly and its lower end rests on the upper end of a rail or chute 93, which is inclined downwardly and secured on the front of the machine and delivers the staples to the place at which they are driven. A cover strip 94 is placed over a portion of the lower end of the rail and prevents the staples from falling off the rail at this point.

In the front face of the head 30 is arranged a vertical guideway 95 in which is mounted for reciprocatory motion a slide 96, the lower end of which carries the staple driver or hammer 97 which at the upward limit of movement is slightly above the discharge point of the rail 93 in a throat or guideway 98 which is of a width to permit the passage of a single staple. At the rear of the throat of the machine may be arranged a magnet 99 of any type supported on a non-magnetic block 100 secured to the base 29 of the machine. The magnet is provided to assure that the staples will stand straight in the throat of the machine.

The hammer slide is reciprocated by a link 101 connected to a rocking arm 102 pivoted on a bracket 103 on the head of the machine. The opposite end of the arm is jointed to a pitman adjustably connected to a bracket 105 on the intermittently movable portion 16 of the clutch. This pitman also serves to support the spring 61 previously referred to, the upper end of the spring being confined by a collar 106.

At the lower or discharge end of the rail is arranged a feeding dog 107, which is pivoted to links 108 on the front of the machine. The front end of the dog lies over the staples on the rail and the rear of the dog is pivoted to a rod 108$^a$ which passes upwardly along the hammer slide and through an eye or lug 109 on the slide. The upper end of the rod is surrounded by a coil spring 110, confined by a nut 111. The arrangement of these parts is such that as the hammer slide reaches the upward limit of its movement, the front end of the dog makes a downward movement positively feeding a staple under the hammer. This action on the part of the machine prevents staples from becoming jammed on the rail.

Means are provided on this machine for pressing or squeezing together the ends of the beads prior to the entrance of the staple so that a tight joint will be assured. This action is partially carried out by the movement inward of the saddle 35 as the bead carrier moves upwardly. It is further insured by positive gripping means, which are embodied in claw levers 112 pivoted to the front of the machine at 113. The lower ends of these levers are formed with teeth or fingers 114 while the upper ends carry rollers 115 which contact with cam faces 116 formed on the side edges of the reciprocating hammer slide. A light spring 117 on each claw lever serves to hold the roller 115 against the cam on the slide. It will be seen from an inspection of Fig. 5 that as the hammer starts to descend, the claw teeth center the bead, which has been raised by the carrier, and just before the staple is driven, the ends are squeezed tightly together.

It is believed that the operation of the stapling machine A will have been clear, and a brief résumé only will be made.

The length of the beads in the trough are taken up one at a time by the operator and the ends placed closely together on the saddles with the point over the anvil, the right hand end of the bead being brought up over the chain 122. The operator then presses momentarily on the treadle 23 which connects the two parts of the clutch for a single revolution. The bead carrier is then raised to carry the bead directly under the hammer when the claw teeth enter the bead. The hammer now descends pressing together the ends of the bead and driving the staple. The pins or fingers 47ª are now given an inward movement by the action of the levers 42 and 44 and the points of the staple are clinched. As the hammer moves upwardly, the bead carrier is lowered and a new staple is fed into the throat of the machine by the feed dog 107. In the meantime the picker arm and the staple bin have been operating continuously and a supply of staples is kept on the rail 93.

The coating portion of the apparatus B, which comprises a bead conveyor and tank, will now be described.

From the table 3 extend arms 118 on which are supported a pair of bearings 119 which sustain a shaft 120. The shaft carries a sprocket 121 by which it is rotated continuously through a chain 122 from the shaft 78. On the end of the shaft 120 at the side of the machine is supported the conveyor in the form of a drum 123, which may be of any preferred form, being here shown as frusto-conical roll having a spiral groove on track 124. Beneath the drum is supported a pan 125 in which is kept a constant level of rubber cement. A tank 126 provided with any preferred form of nozzle 127 supplies cement from the tank to the pan. In the tank may be arranged a stirrer of any type, the shaft being designated by the numeral 128, operated by meshing bevel pinions 129 from a horizontal shaft 130 driven by a belt or sprocket 131 from the constantly driven shaft 75.

The pan 125 is adjustably supported by a screw shaft 132, supported on a hand wheel 133 on a stand 134. The adjustment is to provide for different lengths of beads 37 or depths of immersion as may be desired.

When the operator has stapled the bead, he gives it a half turn passes it along the shaft 120 and drops it into one of the first of the spiral grooves 124, and the rotation of the drum 127 revolves the bead through the cement and passes it along the tank.

As the beads, stapled and cemented, pass off the drum, they pass on to one of a set of inclined arms 135 detachably mounted on a revoluble turret 136 constituting the drying portion C of the apparatus. Around the turret is mounted a pan 137 which catches the drippings from the beads. As each arm becomes filled, the turret is revolved and a new arm positioned. The inclination of the arms holds the beads in the position shown in Fig. 1 whereby a minimum mutual contact is obtained. When the turret is filled, the beads will have drained sufficiently so that the arms may be removed to another rack on which the drying will be completed.

The operation of the machine will render the joining and cementing of beads a much simpler and more economical operation than has been possible heretofore. As far as known to me, I am the first person to form a bead ring by stapling the ends of the bead together, and also am the first person to dip these articles by machine, either alone or in combination with an apparatus for joining the ends of the bead. I am, therefore, entitled to a broad range of equivalents and the invention is not limited to the details shown, nor is the machine necessarily limited for stapling beads but may be used for any purpose for which it may be adapted.

I claim:

1. In an apparatus for the preparation of tire beads, the combination of means for uniting the ends of a bead strip to form a ring, a support projecting from said means and around which the ring is formed, a conveyor carried by said support and disposed to receive the rings formed by the ring forming means, and a coating bath disposed in the path of travel of the rings on the conveyor for coating the rings.

2. In an apparatus for the preparation of tire beads, the combination of means for uniting the ends of a bead strip to form a ring, a support projecting from said means and around which the ring is formed, a conveyor carried by said support and disposed to receive the rings formed by the ring forming means, a coating bath disposed in the path of travel of the rings on the conveyor for coating the rings, and drying means including an arm having its receiving end in cooperative relation with the discharge end of the conveyor.

3. In an apparatus for the preparation of tire beads, the combination of means for uniting the ends of a bead strip to form a ring, a support projecting from said means and around which the ring is formed, a rotatable spiral conveyor mounted at one end on the support and in position to receive the rings formed by the ring forming means, the opposite end of the conveyor being unsupported and unobstructed to permit discharge of the rings from the discharge end of the conveyor, and a coating bath in the path of the rings carried by the conveyor.

4. In an apparatus for the preparation of tire beads, the combination of means for uniting the ends of a bead strip to form a ring, a support projecting from said means and around which the ring is formed, a rotatable spiral conveyor mounted at one end on the support and in position to receive the rings formed by the ring forming means, the opposite end of the conveyor being unsupported and unobstructed to permit discharge of the rings from the discharge end of the conveyor, a coating bath in the path of the rings carried by the conveyor, and drying means including an arm having its receiving end in cooperative relation with the discharge end of the spiral conveyor.

5. In an apparatus for the preparation of tire beads, the combination of means for uniting the ends of a bead strip to form a ring, a support projecting from said means and around which the ring is formed, a rotatable spiral conveyor mounted at one end on the support and in position to receive the rings formed by the ring forming means, the opposite end of the conveyor being unsupported and unobstructed to permit discharge of the rings from the discharge end of the conveyor, a coating bath disposed in the path of the rings carried by the conveyor, and a downwardly inclined drier arm having its receiving end in cooperative relation with the discharge end of the spiral conveyor to receive the rings as they discharge from the conveyor.

6. In an apparatus for the preparation of tire beads, the combination of means for uniting the ends of a bead strip to form a ring, a support projecting from said means and around which the ring is formed, a rotatable frusto-conical drum on the support and driven from the ring forming means, the smaller end of the drum being the receiving end and disposed to receive rings formed by the ring forming means, and a coating bath disposed in the path of rings carried by the conveyor.

7. In an apparatus for the preparation of tire beads, the combination of means for uniting the ends of a bead strip to form a ring, a support projecting from said means and around which the ring is formed, a rotatable frusto-conical conveyor drum on the support and driven from the ring forming means, the smaller end of the drum constituting the receiving end and disposed to receive rings formed by the ring forming means, the large end of the drum being the discharge end thereof, said drum being provided with a ring receiving and conveying spiral leading from the receiving end to the discharge end thereof, and a coating tank having an open top and disposed beneath the drum in position to receive the lower portions of rings embracing and traveling upon the drum.

8. In an apparatus for the preparation of tire beads, the combination of means for uniting the ends of a bead strip to form a ring, a support projecting from said means and around which the ring is formed, a rotatable frusto-conical conveyor drum having a shaft projecting beyond its smaller end and rotatably mounted on the support and driven from the ring forming means, the smaller end of the drum constituting the receiving end and disposed to receive rings formed by the ring forming means, the large end of the drum being the discharge end thereof, said drum being provided with a ring receiving and conveying spiral leading from the receiving end to the discharge end thereof, a coating tank having an open top and disposed beneath the drum in position to receive the lower portions of rings embracing and traveling upon the drum, and drying means including an arm having its receiving end in cooperative relation with the discharge end of the conveyor drum.

HARVEY F. MARANVILLE.